Aug. 1, 1961

R. A. MacMILLAN 2,994,827

PHASE SHIFTING SYSTEM SUMMING QUADRATURE
WAVES IN SINE-COSINE POTENTIOMETER

Filed May 5, 1959

INVENTOR.
RAYMOND A. MacMILLAN
BY
ATTORNEYS 2,994,827
PHASE SHIFTING SYSTEM SUMMING QUADRATURE WAVES IN SINE-COSINE POTENTIOMETER
Raymond A. MacMillan, Greenwood, Mass., assignor to the United States of America as represented by the Secretary of the Air Force
Filed May 5, 1959, Ser. No. 811,235
7 Claims. (Cl. 328—155)
(Granted under Title 35, U.S. Code (1952), sec. 266)

The invention described herein may be manufactured and used by or for the United States Government for governmental purposes without payment to me of any royalty thereon.

This invention relates to a phase shifting system and particularly to a phase shifter receiving a sinusoidal A.C. input signal whose frequency may vary over a wide range and shifting it smoothly and continuously in phase without ambiguity over 360° while retaining its amplitude constant.

There are many electrical measurements wherein it is frequently necessary to have available a source of sinusoidal voltage of accurately known phase. A voltage source of this nature may also be utilized to drive other equipment. When utilized to drive other equipment, the phasable voltage source should be smoothly and continuously variable in phase without ambiguity over 360°. It is also a desirable characteristic that a phase system produce a constant amplitude output for all phase angles and over a wide frequency range, without distorting the output voltage waveform. An additional desirable requirement resides in the ability to accurately and simply indicate the precise phase shift of the signal.

It is an object of the present invention to provide a novel phase shifting system which is frequency insensitive over a wide frequency range.

It is another object of the present invention to provide a novel phase shifting system adopted to receive a sinusoidal A.C. input signal whose frequency varies over a broad band width and producing a constant amplitude signal output which may be varied in phase continuously over 360°.

Still another object of the present invention is to provide a phase shifting system receiving a sinusoidal A.C. signal varying over a wide frequency range and shifting aforesaid signal smoothly, and continuously from 0° through 360° to 0° while maintaining the amplitude thereof precisely constant and additionally maintaining the frequency of the output signal identical to that of the input signal.

Yet another object of the present invention is to provide a phase shifting system whose output voltage is continuously variable in phase through 360°, with constant amplitude over 360°, and over a wide frequency range, the phase angle being precisely given by a dial reading.

A still further object of the present invention is to provide a phase shifting system to which a sinusoidal A.C. signal varying over a wide frequency range is applied, wherein the output voltage with reference to the applied signal is continuously variable in phase over 360° while maintaining constant amplitude and sinusoidal character.

A more complete understanding of the operation of the present invention, as well as other objects and features of advantages thereof, will be gleaned from a perusal of the following specification especially when taken in connection with the accompanying drawings in which.

Figure 1:
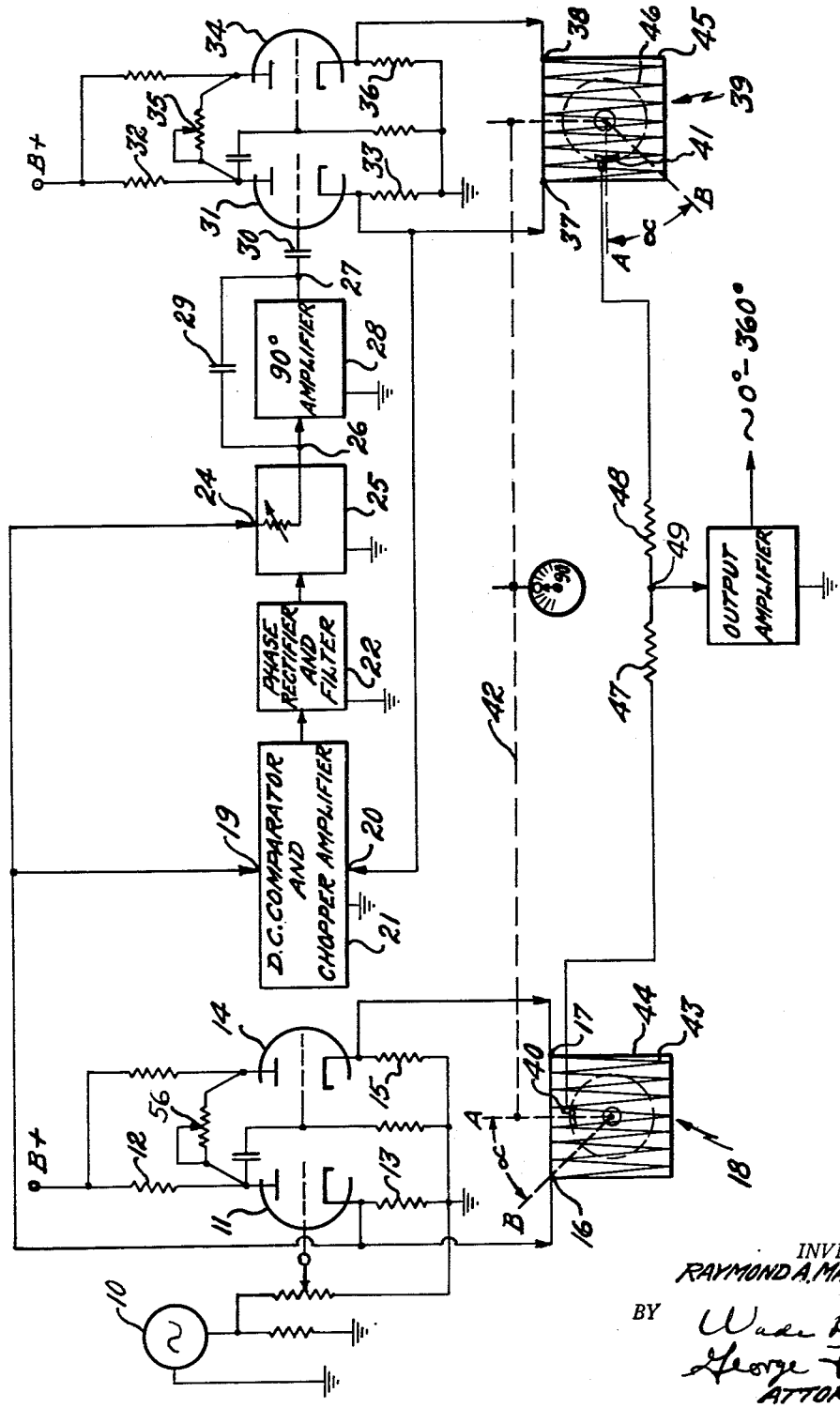
FIGURE 1 illustrates one form of the present invention which is shown partly in schematic and partly in block diagram.

Now referring to FIGURE 1 in detail, there is shown signal source 10 producing a sinusoidal signal of 0° phase. The sinusoidal signal is one which varies over a wide range of frequencies. The source signal is fed to phase splitting cathode follower circuit 11. Phase splitting circuit 11 is one in which the input voltage is applied to the grid of the triode incorporated therein and thereby producing an A.C. sinusoidal voltage having a 180° phase shift at anode load resistor 12 and a 0° phase shift at cathode load resistor 13. The 180° phase-shifted voltage is applied to the grid of the triode incorporated in cathode follower 14 which then appears at cathode resistor 15. The A.C. sinusoidal voltages at cathode resistors 13 and 15 respectively are made equal to each other and the source signal by varying the value of adjustable resistor 56. Large values of resistance and capacitance are used in the coupling circuits to ensure accuracies in phase relationships or input and output voltages.

A pair of voltages are available, one by way of the cathode of phase-splitter 11 and the other from the cathode of cathode follower 14. Both are equal in A.C. amplitude to each other and to the source voltage, both also have a D.C. content. One of the pair of voltages, however, has a precise 0° phase shift and the other, a precise 180° phase shift. The pair of voltages have a low impedance source. The voltage from the cathode phase-splitter 11 is fed to terminal 16 of sine potentiometer 18 and the voltage from cathode follower 14 is fed to terminal 17 of potentiometer 18.

The A.C. voltage having a 0° phase shift obtained from the cathode of phase-splitter 11 is also applied to point 19 of D.C. comparator and chopper amplifier 21 and to point 24 of A.C. variable resistance 25 and therethrough to amplifier 28. Amplifier 28 is provided with feedback capacitor 29 connecting output terminal 27 to input terminal 26. Initially, A.C. variable resistance 25 is made equal in value to the value of the capacitive reactance of capacitor 29 in the presence of a fixed frequency input voltage applied at point 24. This can be accomplished by first adjusting the value of variable resistance 25 so that the A.C. input voltage at point 24 is equal in amplitude to the A.C. output voltage at point 27. When the value of variable resistance 25 is made equal to the value of capacitive reactance of feedback capacitor 29 for any specific input frequency, the overall gain, G, is unity and the phase angle of the output voltage from amplifier 28 is 90° with an error of $1/A$ radians where A is the open loop gain. Conversely, when the input voltage to variable resistance 25 is made to equal the output voltage of amplifier 28 for any specific input frequency, by adjusting variable resistance 25, the gain is equal to unity, and the value of variable resistance 25 is equal to the value of the capactive reactance of capacitor 29. The resulting phase angle of the output voltage at point 27 is 90°. For example, with an amplifier voltage gain of 4000, the output voltage will have a 90° phase angle wiithin an error of 0.01432°; 1 radian $= 57.3°$ or $1/4000$ radian $= 0.01432°$.

It is to be noted that the aforementioned mode of operation wherein the value of capacitive reactance of capacitor 29 is made equal to that of A.C. variable resistance 25 is accomplished for only one specific input frequency. However, it is required that this equality be maintained over a wide range of frequencies. Since the capacitive reactance of capacitor 29 changes with quency, an automatic and continuous control of A.C. variable resistance 25 is provided so that the value of capacitive reactance of capacitor 29 is always maintained equal to that of A.C. variable resistance 25 regardless of the frequency variations of the input voltage.

The output voltage from amplifier 28 measured at point 27 is precisely equal in amplitude to that of the A.C. input voltage at point 24 and is also precisely shifted in phase by 90°. The A.C. voltage having a 90° phase shaft at point 27 is applied to the control grid of phase-splitter cathode follower circuit 31 by way of capacitor 30 thereby producing an A.C. voltage having a 180° phase shift at anode resistor 32 and an A.C. voltage having a 0° phase shift at cathode resistor 33. The 180° phase-shifted voltage is applied to the grid of the triode incorporated in cathode follower 34 which then appears at cathode resistor 36. The A.C. sinusoidal voltages at cathode resistors 33 and 36 respectively are made equal to each other and the source signal by varying the value of adjustable resistor 35. It is to be noted that the A.C. sinusoidal input voltage to phase-splitter, cathode follower 31 had a precise phase angle of 90°. This 90° phase-shifted sinusoidal voltage is not shifted in phase when it appears at cathode resistor 33 but is shifted in phase 180° at anode resistor 32.

The aforesaid 180° phase shift is not altered at cathode resistor 36 so that an A.C. sinusoidal voltage having a 270° phase appears at cathode resistor 36.

The voltage from the cathode of phase-splitter, cathode follower 31, is fed to point 37 of sine potentiometer 39. The voltage from the cathode of cathode follower 34 is fed to point 38 of sine potentiometer 39.

The automatic and continuous retention of a precise 90° phase shift and unity gain regardless of frequency variation is provided by way of amplifier 28. The A.C. voltage, for a specific frequency, having a precise 0° phase is applied to point 19 of D.C. comparator and chopper amplifier 21 and to point 24 of variable resistance 25 by way of the cathode of phase-splitter, cathode follower 11. An A.C. voltage having a precise 90° phase for the aforesaid specific frequency is fed to point 20 of D.C. comparator and chopper amplifier 21 by way of the cathode of phase-splitter, cathode follower 31. The A.C. voltages at points 19 and 20 are precisely equal in amplitude. D.C. comparator and chopper amplifier 21 first rectifies and filters the two A.C. input voltages and produces two D.C. voltages representative of the two A.C. input voltages. The two D.C. voltages are compared to each other and if the potentials are unequal because of frequency variations of the source signal, an output voltage is provided which is chopped into a representative A.C. voltage which is then amplified. Phase rectifier-filter 22 accepts the amplified A.C. voltage and produces a filtered D.C. voltage serving as a control voltage for variable resistance 25. Variable resistance 25 will vary its A.C. resistance is response to and in accordance with the magnitude of the aforementioned control voltage. Thus, variable resistance 25 will have its A.C. resistive magnitude automatically and continuously controlled so that regardless of the variations of the value of capacitive reactance of capacitor 24, in response to frequency variation, the value of variable resistance 25 will always be equal to the value of capacitive reactance of capacitor 29.

Figure 2:
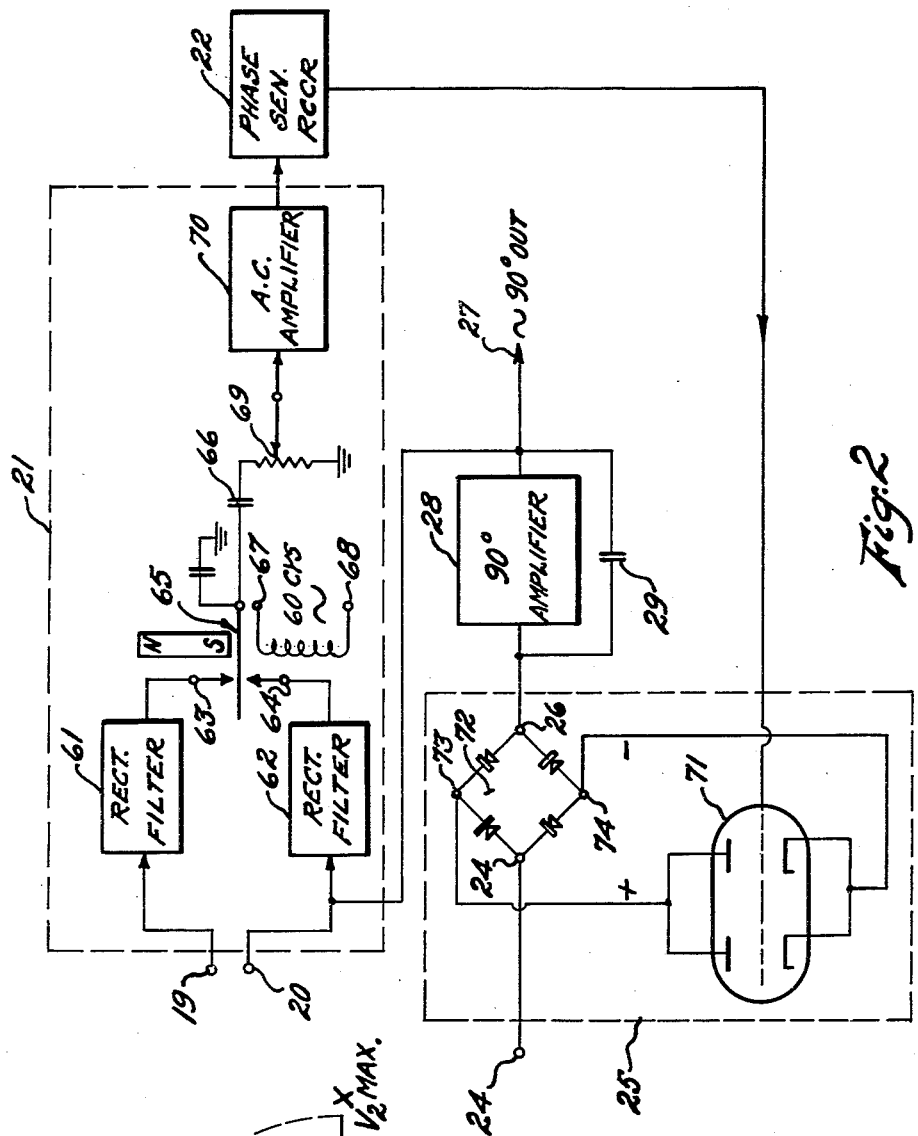
FIGURE 2 illustrates a system partly in schematic and partly in block diagram form for controlling an amplifier to maintain its unity gain and simultaneously provide an output voltage precisely shifted in phase 90° in reference to its input voltage regardless of the frequency variations thereof.

The mode of operation to provide an automatic and continuous control of amplifier 28 is described in greater detail by referring to FIGURE 2, wherein the two voltages applied to points 19 and 20 of D.C. comparator and chopper amplifier 21 of FIGURE 1 is shown as applied to inputs 19 and 20 of FIGURE 2. Initially, for a specific frequency, the input voltage applied to input 19 has 0° phase and the one applied to input 20 has 90° phase. The input voltages are precisely equal in amplitude. Rectifier-filter 61 provides a D.C. voltage to point 63 of vibrator 65 and rectifier-filter 62 provides a D.C. voltage to point 64. If the potentials are equal at points 63 and 64, no change in the charge of coupling capacitor 66 occurs, as the vibrator arm contacts each circuit; therefore no A.C. voltage appears at the input of A.C. amplifier 70. However, when the frequency of the source signal varies, the potential at point 64 is more or less than the potential at point 63, the difference becomes "chopped" and an alternating voltage appears by way of potentiometer 69 at the input of amplifier 70. The amplitude thereof is proportional to the difference of the D.C. potentials at points 63 and 64. The phase of this voltage relative to the phase of energizing voltage for vibrator 65 has one of two possible values, 0° or 180°. The phase of the vibrator drive voltage applied to terminals 67 and 68 is so chosen that the D.C. potential produced by phase-sensitive rectifier 22 is negative when the D.C. potential as point 64 is less than at point 63.

The filtered D.C. voltage produced by phase-sensitive rectifier 22 is applied to variable resistance 25 by the way of the control grid of twin triode 71, the two halves being connected in parallel. Crystal-bridge rectifier 72 is connected to the anodes of triode 71 by way of point 73 and to the cathodes by way of point 74. The A.C. input voltage to be controlled by variable resistance 25 is applied to point 24 of bridge rectifier 72 and the A.C. output voltage is produced at point 27. Twin-triode 71 in combination with crystal bridge rectifier 72 provides a control circuit for alternating voltage and/or current. The apparent resistance of the bridge rectifier can be varied from megohms, when the tube is cut off, to a few hundred ohms when the tube is conducting fully. The A.C. voltage fed into point 24 of bridge rectifier 72 is presented with an A.C. resistance whose magnitude varies in response to and in accordance with the D.C. control voltage applied to the control grid of tube 71.

A more detailed description of the mode of operation of the bridge rectifier 72 and associated control tube 71 is given in my copending patent application entitled "Variable A.C. Transducer" filed on May 5, 1959, and bearing Serial No. 811,237. The A.C. output voltage from point 26 of variable resistor 25 is applied to amplifier 28. There is thus provided a system to automatically and continuously control an amplifier so that an A.C. output voltage results which is always precisely equal in amplitude to the A.C. input voltage regardless of frequency variation and always produces a precise 90° phase shaft relative to the input voltage.

A more detailed description of the mode of operation of the above-mentioned system is given in my copending patent application entitled "Automatic Phase Stabilizer System" filed on May 5, 1959, and bearing the Serial No. 811,238.

Referring again to FIGURE 1, from each of cathode resistors 13, 15, 33 and 36, there is available an A.C. sinusoidal voltage which is equal in amplitude to the others and to the source signal. The phase angle of the voltages is precisely 0°, 180°, 90° and 270°, respectively. The phases and amplitudes of the four aforesaid A.C. voltages are maintained constant regardless of the wide range of frequency variation in the source signal. The A.C. sinusoidal voltage $E_1$ of 0° phase is applied to point 16 of sine potentiometer 18. The A.C. sinusoidal voltage, $E_2$, of 180° phase is applied to point 17 of sine potentiometer 18, one voltage across each half of the resistance winding, the center of the resistance being a common path via the chassis ground. The other two aforementioned A.C. sinusoidal voltages, one having a phase of 90° and referred to as $E_3$ and the other a phase of 270° and referred to as $E_4$, with equal amplitudes, and equal in amplitudes to $E_1$ and $E_2$ are applied to each half of cosine potentiometer 39 by way of points 37 and 38, respectively. Contact brushes 40 and 41 of potentiometers 18 and 39, respectively, are rotated in unison by drive shaft 42 which is common to both potentiometers. Contact brush 41 of potentiometer 39 is mechanically displaced 90° in respect to contact brush 40 of potentiometer 18.

The alternating voltage which appears between brush 40 and ground is the result of the brush position and the current which flows in that half of sine potentiometer 18 due to the A.C. voltage $E_1$, when brush 40 is moved from position A to position B. As brush 40 is rotated, the amplitude of the voltage at the brush varies as the sine of the angle $\alpha$. The phase angle of this voltage in respect to A.C. voltage $E_1$ is either 0° or 180°, depending on which half of the potentiometer resistance is contacted by the brush. For the position shown in B, the phase angle is 0°.

In like manner, the voltage at brush 41 of cosine potentiometer 39 varies in amplitude as the cosine of the angle $\alpha$, since brush 41 is mechanically positioned 90° from brush 40, and both brushes are rotated in unison. The voltage at brush 41 can have one of two possible phases, 90° or 270°. For the position shown at B, it is 90°.

For a change in mechanical angle $\alpha$ from 0° to 90°, the amplitude of the output voltage $V_1$ from brush 40 will be $V_1 \sin \alpha$, and the amplitude of the output voltage $V_2$ from brush 41 will be $V_2 \cos \alpha$, and $V_1$ max.$=V_2$ max. (see FIGURE 2). However, an angle of $\alpha$ chosen so that $V_1$ is maximum causes $V_2$ to be zero and vice versa.

There are available two voltages (see position B) having a phase difference of 90°, with amplitudes which are proportional to the sine and cosine of the mechanical angle of brush-shaft rotation. These two voltages are added in resistors 47 and 48. The resulting voltage represented by C of FIGURE 3 and produced by summing two vectors is constant in amplitude for any angle of $\alpha$ and will have an electrical phase angle which can vary from 0° to 90° in reference to $V_1$, depending on the position of the mechanical angle $\alpha$.

The voltage which appears between brush 40 and ground has an amplitude which is proportional to the sine of the angle of rotation. In a similar manner, the cosine voltage which appears between brush 41 and ground has an amplitude which is proportional to the cosine of the angle of rotation.

Figure 3:
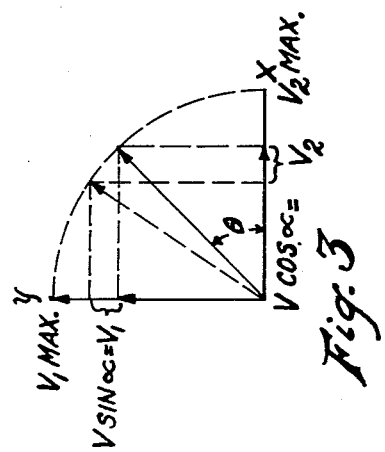
FIGURE 3 shows the vector relationships provided in the sine and cosine potentiometers.

FIGURE 3 shows that a sinusoidal voltage with amplitude values which vary from 0 to 1.0 as a sine function combined with a cosine voltage with amplitude values varying from 1.0 to 0, as a cosine function, yields a resultant or vector voltage of phase angle corresponding to the sine-cosine amplitudes of the respective voltages and of constant amplitude for any phase angle over 90°. By selecting the proper phase quadrant of the combining voltages, this vector addition is extended through 360°. The resultant voltage appears at junction of two equal resistors 47 and 48 of which are connected between brushes 40 and 41 as shown in FIGURE 1.

In FIGURE 1, sine potentiometer 18 is comprised of insulating card 43 upon which is wound wire resistance 44. Brush contact 40 moves in a circle and is rotated by common drive shaft 42. Cosine potentiometer 39 is comprised of insulating card 45 upon which is wound wire resistance 46. Brush contact 41 is displaced 90° from brush contact 40 and is rotated in unison with brush contact 40 as it is rotated by common drive shaft 42.

The four sinusoidal voltages having phase displacements of 0°, 90°, 180°, and 270° are applied to either side of center-tapped sine and cosine potentiometers. The output voltage from sine potentiometer 18 is taken from brush 40 by way of resistor 47 and the output voltage from cosine potentiometer is taken from brush 41 by way of resistor 48. The vector voltage is taken from junction of resistors 47 and 48 as shown at point 49. The vector voltage is sinusoidal and variable from 0° to 360° to 0°. It remains constant in amplitude regardless of frequency variation of the source signal.

Summation can also be accomplished in the common plate or cathode load resistor of a twin triode, the grids of which are supplied from the respective potentiometers.

The common drive shaft 42 may carry a 360° dial from which the precise phase angle of the vector voltage may be read.

While I have shown and described my invention as applied to one particular embodiment thereof, it will be obvious to those skilled in the art that changes and modifications may be made without departing from my invention and I, therefore, aim in the appended claims to cover all such changes and modifications as fall within the true spirit and scope of my invention.

What is claimed is:

1. In a phase shifting system, a source of sinusoidal A.C. voltage with 0° phase, said source voltage varying over a wide range of frequencies, first means to convert said source voltage to a first pair of sinusoidal A.C. voltages of equal amplitude to each other and to said source signal, one of said voltages having a precise 0° phase and the other a precise 180° phase regardless of aforesaid frequency variations, means to shift the phase of said 0° phase voltage received from said first converting means a precise 90°, said phase-shifted voltage having an amplitude equal to said 0° phase voltage, means to automatically and continuously retain said precise 90° phase shift and said amplitude regardless of aforesaid frequency variations, second means to convert said 90° phase-shifted sinusoidal voltage to a second pair of sinusoidal A.C. voltages of equal amplitudes to each other and to said 0° phase signal, one of said voltages having a precise 90° phase and the other a precise 270° phase regardless of aforsaid frequency variations, a pair of complementary vector output voltage producing circuits, said pair of complementary circuits including a sine and cosine potentiometer, said sine potentiometer having a pair of input terminals and an output rotating brush, said pair of input terminals receiving said first pair of sinusoidal voltages, said cosine potentiometer having a pair of input terminals and an output rotating brush, said pair of input terminals receiving said second pair of sinusoidal voltages, drive means common to said sine and cosine potentometers to rotate said brushes in unison, said common drive means having attached thereto a 0° to 360° indicator, and vector addition means to obtain a sinusoidal vector voltage from each of the vector output voltages of said sine potentiometer and said cosine potentiometer.

2. In a phase shifting system, a sinusoidal A.C voltage source with a 0° phase having a wide range of frequency variation, first means to convert said source voltage to a first pair of sinusoidal voltages, said first pair of sinusoidal voltages being equal in amplitude to said source voltage, one of said first pair of voltages having a precise 0° phase shift and the others a precise 180° phase shift regardless of aforesaid frequency variation, means to shift the phase of said 0° phase voltage received from said first converting means by a precise 90° while retaining equal amplitude thereto, means to automatically and continuously maintain said precise 90° phase shift and said equal amplitudes during aforesaid frequency variations, second means to convert said 90° phase-shifted voltage to a second pair of sinusoidal voltages, said second pair of voltages being equal in amplitude to said 0° phase voltage, one of said second pair of voltages having a precise 90° phase shift and the other a precise 270° phase shift regardless of aforesaid frequency variations, a pair of complementary vector output voltage producing circuits, said pair of complementary circuits including combination of two sine potentiometers with a common drive shaft, the output brush of one being mechanically displaced by 90° from the output brush of the other, means to apply said first pair of voltages to one of said sine potentiometers, means to apply said second pair of voltages to the other of said sine potentiometers, and means to vectorially add the vector voltage output from one of said brushes to the voltage output from the other of said brushes.

3. In a phase shifting system, a source of sinusoidal A.C. voltage with a 0° phase having a wide range of frequency variation, first means to convert said source voltage to a first pair of sinusoidal voltages equal in amplitude to said source voltage regardless of said frequency variation, one of said first pair of voltages having a precise 0° phase shift and the other a precise 180° phase shift regardless of aforesaid frequency variation, second means to convert said 0° phase voltage to a second pair of sinusoidal voltages equal in amplitude to said 0° phase voltage regardless of said frequency variation, one of said second pair of voltages having a precise 90° phase shift and the other a precise 270° phase shift regardless of said frequency variation, means to continuously and automatically maintain the amplitude of said second pair of voltages equal to said first pair of voltages, a pair of complementary vector output producing circuits, said pair of complementary circuits including a sine and cosine potnetiometer, said sine potentiometer having a pair of input terminals and a rotary output brush, said pair of input terminals receiving said first pair of sinusoidal voltages, said cosine potentiometer having a pair of input terminals and a rotary output brush, said input terminals receiving said second pair of sinusoidal voltages, a common drive shaft to rotate said output brushes in unison, means attached to said common drive shaft to indicate phase from 0° to 360°, and means to vectorially add the vector output sinusoidal voltages from said brushes to obtain a sinusoidal output voltage varying from 0° to 360° in phase relative to said source voltage, said varying sinusoidal voltage precisely maintatining the magnitude thereof during said periods of said frequency and phase variation.

4. A phase shifting system comprising a source of sinusoidal A.C. voltage with 0° phase having a wide range of frequency variation, means to convert said source voltage to first and second pair of sinusoidal voltages precisely equal in amplitude to each other, said first pair of voltages having one voltage a precise 0° phase and the other a precise 180° phase, said second pair of voltages having one voltage with a precise phase of 90° and the other a precise 270° phase, means to automatically and continuously retain said amplitudes precisely equal and said precise phase shifts during aforesaid frequency variations of said source voltage, a pair of complementary vector output voltage producing circuits, said pair including a sine and cosine potentiometer, said sine potentiometer having a pair of input terminals and a rotary output brush, said input terminals receiving said first pair of sinusoidal voltages, said cosine potentiometer having a pair of input terminals and a rotary output brush, said input terminals receiving said second pair of sinusoidal voltages, a common drive shaft to rotate said output brushes in unison, and means to add vectorially the vector output voltages from said ouptut brushes to obtatin a sinusoidal voltage varying in phase from 0° to 360° relative to said source voltage, said varying sinusoidal voltage precisely maintaining the magnitude thereof during said frequency and phase variations.

5. In a phase shifting system, a source of sinusoidal A.C. voltage with a 0° phase having a wide range of frequency variation, means to convert said source voltage to first and second pairs of sinusoidal voltages precisely equal in amplitude to each other, said first pair of voltages having one voltage a precise 0° phase and the other a precise 180° phase, said second pair of voltages having one voltage a precise 90° phase and the other a precise 270° phase, means to automatically and continuously retain said amplitudes precisely equal and said precise phase shifts during said variation of said frequency of said source voltage, a pair of complementary vector output voltage producing circuits, said pair of complementary circuits including combination of two sine potentiometers with a common drive shaft, the output brush of one being mechanically displaced by 90° from the output brush of the other, means to apply said first pair of sinusoidal voltages to one of said sine potentiometers, means to apply said second pair of sinusoidal voltages to the other of said sine potentiometers, and means to vectorially add the vector output voltage of one of said brushes to the vector output voltage of the other of said brushes.

6. In a phase shifting system, a sinusoidal A.C. voltage source, the voltage therefrom having a 0° phase and also a wide frequency variation, first means to convert said 0° phase voltage to a first pair of equal amplitude voltages, one of said first pair of voltages having a precise 0° phase and the other a precise 180° phase, said first converting means including a first pair of low impedance output circuits, means to shift the phase of said 0° phase voltage received from said first converting means a precise 90° while maintaining the amplitude thereof, means to automatically and continuously maintain the phase and amplitude of said 90° phase shifted signal, second means to convert said 90° phase-shifted voltage to a second pair of sinusoidal voltages having equal amplitudes, one of said second pair of voltages having a precise 90° phase and the other a precise 270° phase, said second converting means including a second pair of low impedance output circuits, a pair of complementary vector output voltage producing circuits, said pair of complementary circuits including a sine and cosine potentiometer, said sine potentiometer having a pair of input terminals and an output rotary brush, said input terminals receiving said first pair of voltages, said cosine potentiometer having a pair of input terminals and an output rotary brush, said pair of input terminals receiving said second pair of voltages, means to rotate said brushes in unison, means to indicate the azimuthal position of said rotational means, and means to vectorially add the vector output voltages from said rotary brushes.

7. In a phase shifting system, a sinusoidal A.C. voltage source, the voltage therefrom having a 0° phase and also a wide frequency variation, first means to convert said sinusoidal voltage to a first pair of equal amplitude voltages, one of said first pair of voltages having a precise 0° phase and the other a precise 180° phase, means to shift the phase of said 0° phase voltage received from said first converting means 90° while maintaining the amplitude thereof, means to automatically and continuously maintatin said phase and said amplitude of said 90° phase shifted voltage during said frequency variations, second means to convert said 90° phase shifted voltage to a second pair of equal amplitude voltages, one of said second pair of voltages having a precise 90° phase shift and the other a precise 270° phase shift, a pair of complementary vector output voltage producing circuits, said pair of complementary circuits, including a sine and cosine potentiometer, said sine potentiometer having two input terminals and an output rotary brush, said pair of input terminals receiving said first pair of voltages, said cosine potentiometer having a pair of input terminals and an output rotary brush, said pair of input terminals receiving said second pair of input voltages, means to rotate said brushes in unison, and means to vectorially add the vector output voltages from said brushes.

References Cited in the file of this patent

UNITED STATES PATENTS

| | | |
|---|---|---|
| 2,085,940 | Armstrong | July 6, 1937 |
| 2,434,057 | Sproule | Jan. 6, 1948 |
| 2,454,426 | Beckwith | Nov. 23, 1948 |
| 2,576,499 | Bowes | Nov. 27, 1951 |